United States Patent
Iwata

(10) Patent No.: US 7,542,570 B2
(45) Date of Patent: Jun. 2, 2009

(54) INFORMATION ENCRYPTION TRANSMISSION/RECEPTION METHOD

(75) Inventor: Kiyoshi Iwata, Nagoya (JP)

(73) Assignee: AESOP Corporation, Nagoya-shi (JP)

( * ) Notice: Subject to any disclaimer, the term of this patent is extended or adjusted under 35 U.S.C. 154(b) by 151 days.

(21) Appl. No.: 10/576,565

(22) PCT Filed: Oct. 20, 2004

(86) PCT No.: PCT/JP2004/015493

§ 371 (c)(1),
(2), (4) Date: Apr. 5, 2007

(87) PCT Pub. No.: WO2005/039102

PCT Pub. Date: Apr. 28, 2005

(65) Prior Publication Data

US 2007/0269047 A1   Nov. 22, 2007

(30) Foreign Application Priority Data

Oct. 20, 2003   (JP) .............................. 2003-359849

(51) Int. Cl.
- *H04L 9/00* (2006.01)
- *G06F 7/04* (2006.01)
- *H04L 9/32* (2006.01)

(52) U.S. Cl. ...................... 380/268; 713/151; 713/152; 726/27; 726/28; 726/29; 726/30; 380/44; 380/45; 380/46; 380/47

(58) Field of Classification Search ................. 380/268
See application file for complete search history.

(56) References Cited

U.S. PATENT DOCUMENTS

| 5,479,514 A | * | 12/1995 | Klonowski ................... 380/47 |
| 5,642,420 A | | 6/1997 | Kuroda et al. |
| 2001/0018660 A1 | * | 8/2001 | Sehr ............................. 705/5 |
| 2002/0126848 A1 | * | 9/2002 | Uyama ....................... 380/255 |

FOREIGN PATENT DOCUMENTS

| JP | 7-245605 A | 9/1995 |
| JP | 7-250059 A | 9/1995 |
| JP | 9-153014 A | 6/1997 |
| JP | 2000-183866 A | 6/2000 |
| JP | 2001-217825 A | 8/2001 |
| JP | 2002-9758 A | 1/2002 |
| JP | 2003-204323 A | 7/2003 |

OTHER PUBLICATIONS

International Search Report of International Application PCT/JP2004/015493 mailed Dec. 7, 2004.

* cited by examiner

*Primary Examiner*—Longbit Chai
(74) *Attorney, Agent, or Firm*—Westerman, Hattori, Daniels & Adrian, LLP.

(57) ABSTRACT

An information encrypting transmission and reception method in an information transmission and reception network composed of a plurality of senders and receivers having computers being connected and communicating each other via a web network and a data center having a server computer for receiving electronic key data of bit data formed by the senders and receivers and personal data such as address corresponding to each electronic key data to register the serer computer and certifying the senders and the receivers with each personal data.

8 Claims, 3 Drawing Sheets

Fig 2

| transmission source | encryption state | transmission destination |
|---|---|---|
| sender (3) | firstly encrypted data | sender server (5A) |
| sender server (5A) | inquiry of key data or the like of receiver | server of data center (2A) |
| sender server (5A) | secondly encrypted data | receiver server (6) |
| receiver server (6) | inquiry of key data or the like of sender | server of data center (2A) |
| receiver server (6) | thirdly encrypted data | receiver (4) |

INFORMATION ENCRYPTION TRANSMISSION/RECEPTION METHOD

TECHNICAL FIELD

The present invention relates to an information encrypting transmission and reception method which is substantially a perfect method having no danger that information is decrypted by a person other than a sender and a receiver of the information in transmissions and receptions of plaintext information of various contents in use of computers connected to a web network.

BACKGROUND ART

As conventional, an information encrypting transmission and reception method is implemented by various proposed cryptosystems. The best known cryptosystems of those proposed systems is an RSA (Rirest-Shamir-Adleman). In the RSA, sender's information is encrypted in use of receiver's "public key" before transmitting, and also, the sender and the receiver transmit and receive their electronic signatures so that the receiver certifies the identification of the sender and the validity of the transmitted information. Such double processes are required in the RSA (for example, see Japanese patent applications laid-open No. H11-353280 and No. 2001-052125).

DISCLOSURE OF THE INVENTION

PROBLEM TO BE SOLVED BY THE INVENTION

The present invention has an object for providing an information encrypting transmission and reception method in transmissions and receptions for exchanging encrypted information between a sender and a receiver. In the method of the present invention, it is not necessary to transmit and receive electronic signatures separately from the information to be exchanged as the above described conventional cryptosystem. Accordingly, in the method of the present invention, the sender and the receiver are not required to disclose their key information to each other, and further, it is very difficult or substantially impossible for a third person to interpret the key information or the encrypted information while the information is 100% reproducible by the receiver.

MEANS FOR SOLVING PROBLEM

An information encrypting transmission and reception method according to the present invention has the following structure, as a first characteristic,:

in an information transmission and reception network composed of a plurality of senders and receivers having computers being connected and communicating each other via a web network and a data center having a server computer for receiving electronic key data of bit data formed by the senders and receivers and personal data such as address corresponding to each electronic key data to register the server computer and certifying the senders and the receivers with each personal data, comprising:

by one of the senders, firstly decrypting bit data of original information such as plaintext to be transmitted to one of the receivers by performing an exclusive OR operation in use of the bit data of the registered electronic key of the sender and transmitting the firstly encrypted data attached with personal data of the sender and the receiver to the receiver;

by the server computer of the data center, decrypting the bit data of the electronic key of the sender by performing an exclusive OR operation on the transmitted firstly encrypted bit data in use of bit data of the key data of the sender certified with the personal data of the sender, secondly encrypting the decrypted data by performing an exclusive OR operation the in use of bit data of the registered electronic key of the receiver certified with transmitted personal data of the receiver so as to form secondly encrypted bit data, and transmitting the secondly encrypted bit data to the receiver; and by the receiver, receiving the secondly encrypted bit data from the data center, and decrypting the secondly encrypted bit data in to the original information such as plaintext by performing an exclusive OR operation in use of bit data of the electronic key of the receiver.

According to the above encryption transmission and reception method of the present invention, since the sender and the receiver are directly connected via the server computer forming a data center provided on the web network, a congestion of information traffic may be caused when encrypted transmissions from senders are concentrated.

Accordingly, in order to cast aside such concern in advance, the present invention is provided to include the following structure, as a second characteristic,:

in an information transmission and reception network composed of a plurality of senders and receivers having computers being connected and communicating each other via a web network and a data center having a server computer for receiving electronic key data of bit data formed by the senders and receivers and personal data such as address corresponding to each electronic key data to register the server computer and providing the data only to a person who is certified his or her validity in use of the registered data as certification data, comprising:

providing a sender server computer for transmitting and receiving data of the senders and a receiver server computer for transmitting and receiving data of the receivers that are connected to the web network;

firstly encrypting bit data of original information such as plaintext to be transmitted from one of the senders to one of the receivers by performing an exclusive OR operation in use of bit data of electronic key of the sender and transmitting the firstly encrypted bit data attached with personal data of the receiver to the sender server computer;

by the sender server computer, receiving bit data of the electronic key of the receiver by submitting personal data of the receiver to the data center, secondly encrypting the firstly encrypted bit data by performing exclusive OR operation in use of receive bit data of the electronic key of the receiver, and transmitting the secondly encrypted bit data attached with personal data of the sender and the receiver to the receiver server computer;

by the receiver server computer, receiving the secondly encrypted bit data, receiving bit data of the electronic key of the sender by submitting personal data of the sender to the data center, thirdly encrypting the secondly encrypted bit data by performing exclusive OR operation in use of receive bit data of the electronic key of the sender, and informing the receiver about the reception of the thirdly encrypted bit data or transmitting the thirdly encrypted bit data to the receiver; and by the receiver, obtaining the original information such as plaintext from the sender by performing an exclusive OR operation on the thirdly encrypted bit data in use of the bit data of the electronic key of the receiver.

More preferably, in the present invention, the server computer of the data center uses electronic key data set by each sender and receiver as electronic personal seal data for authentication and as information hiding data for hiding data transmitted and received between the sender and the receiver. Further, chaos image data or fractal image data is used for the electronic personal seal data and/or the information hiding data. It is further preferable that the image date is moving data.

The main reason of employing such particular kind of image data is that the data can be reproducible with 100% accuracy at a practical level of information security when chaos image data (still image or moving image) and fractal image data (still image or moving image) are used since the inventor of the present invention employs an encode technique (invisible processing technique) and decode technique (invisible processing technique) in order to be prepared for a case that a trouble happens and re-calculation as legal (objective) evidence is required in the future. In the encode technique and the decode technique, an analysis visible processing technique (a patent application regarding this technique is going to be filed) maintaining a calculation accuracy, simply based on mathematical theories, beyond a common practice in the computing engineering and an "invisible processing technique" reversely applying flow of the processes of the processing technique (process task) are employed as a complementation system. Further, the intensity of encryption and accuracy of evidence can be maximally improved by using the above described nonlinear iterative calculation image data based on a calculation logic (algorithm) which cannot be easily generated by a third person.

Further, according to the present invention, the original information such as plaintext is preliminary encrypted by performing an exclusive OR operation on at least each bite of the original information in use of random number bit data in advance of firstly encrypting of the original data in use of bit data of the electronic key of the sender. After that, data may be firstly encrypted in use of the electronic key data of the sender. The bit data of the random number is registered with authentication data of the sender to the server computer of the data center and provided to an authenticated person.

According to the present invention, encryption may be preferably performed in the same way as the above described preliminary encryption in any encryption with each electronic key.

Further, the data of the preliminary electronic key may be used as data of an electronic envelop.

EFFECT OF THE INVENTION

According to the present invention, electronic keys of each sender and receiver are registered in a data center on a web network. In the data center, transmitted data encrypted by the sender in use of own key is decrypted with the sender's key and then encrypted in use of receiver's key. Accordingly, authentication of the sender and the receiver and encryption of the transmitted data addressed to the receiver are simultaneously performed. Therefore, as a conventional public key system, the process of separately transmitting the sender's electronic signature to the receiver in order to authenticate the sender is not required so that high-speed processing in transmissions and receptions of encrypted document can be achieved.

Further, since transmission and reception of key information are not performed between the sender and the receiver, it is superior in security.

In other words, according to the present invention, "double processes" of electronic signature validation as shown in the conventional information communication can be avoided. This is because, as conventional document exchanges involving "notary office," an objective legal evidence admissibility as a "digital notary office" may store processing history (CR1-->CR2-->CR3) of information communication similar to the presence of the record of registered personal seal and tally impression (obtain as a communication record). Further, in the encrypted information having legal authentication function (notarization) with objectivity beyond conventional arts, "disturbance process of information" like shuffling playing cards which is necessary in conventional encryption process is replaced with hiding of information (exclusive OR operation of particular image data and information data, which has an electronic personal seal (personal seal or registered personal seal)) by chaos image (still image or moving image) and fractal image (still image or moving image). Therefore, according to the present invention, a information security network system can be established, that is not requiring "double process" while legal evidence admissibility having an objectivity beyond that of public key encryption within shorter period of time than the conventional common key encryption, and also, having an advantage of steganography encryption.

BRIEF DESCRIPTION OF THE DRAWINGS

FIG. 2 is an explanatory table showing a relationship between a transmission source and a transmission destination in a transmission and reception method according to the present invention.

BEST MODE FOR CARRYING OUT THE INVENTION

Figure 1:
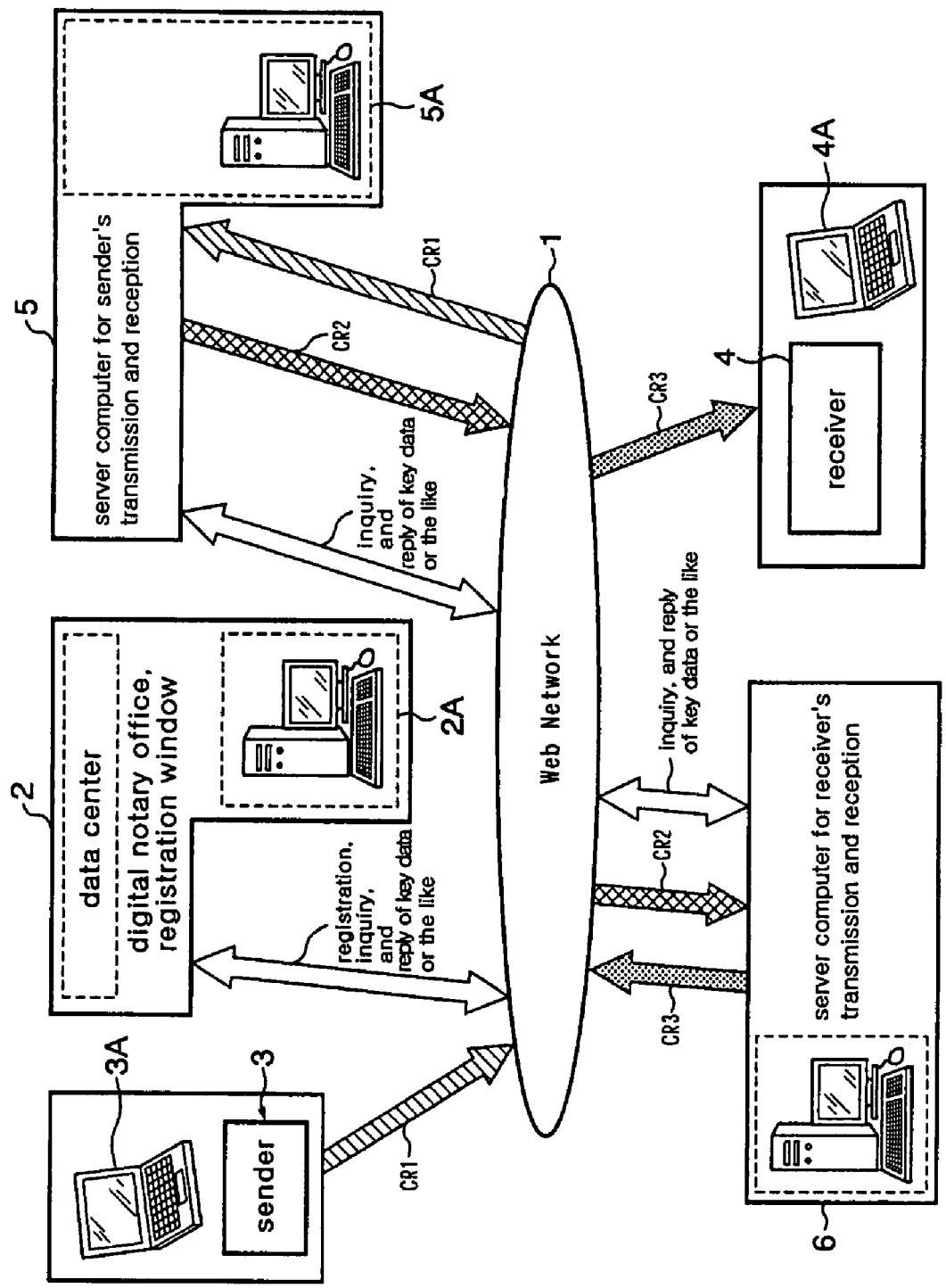
FIG. 1 is a block diagram showing a frame format of a transmission and reception system and a manner of transmitting and receiving in a second structure according to the present invention.
Figure 3:
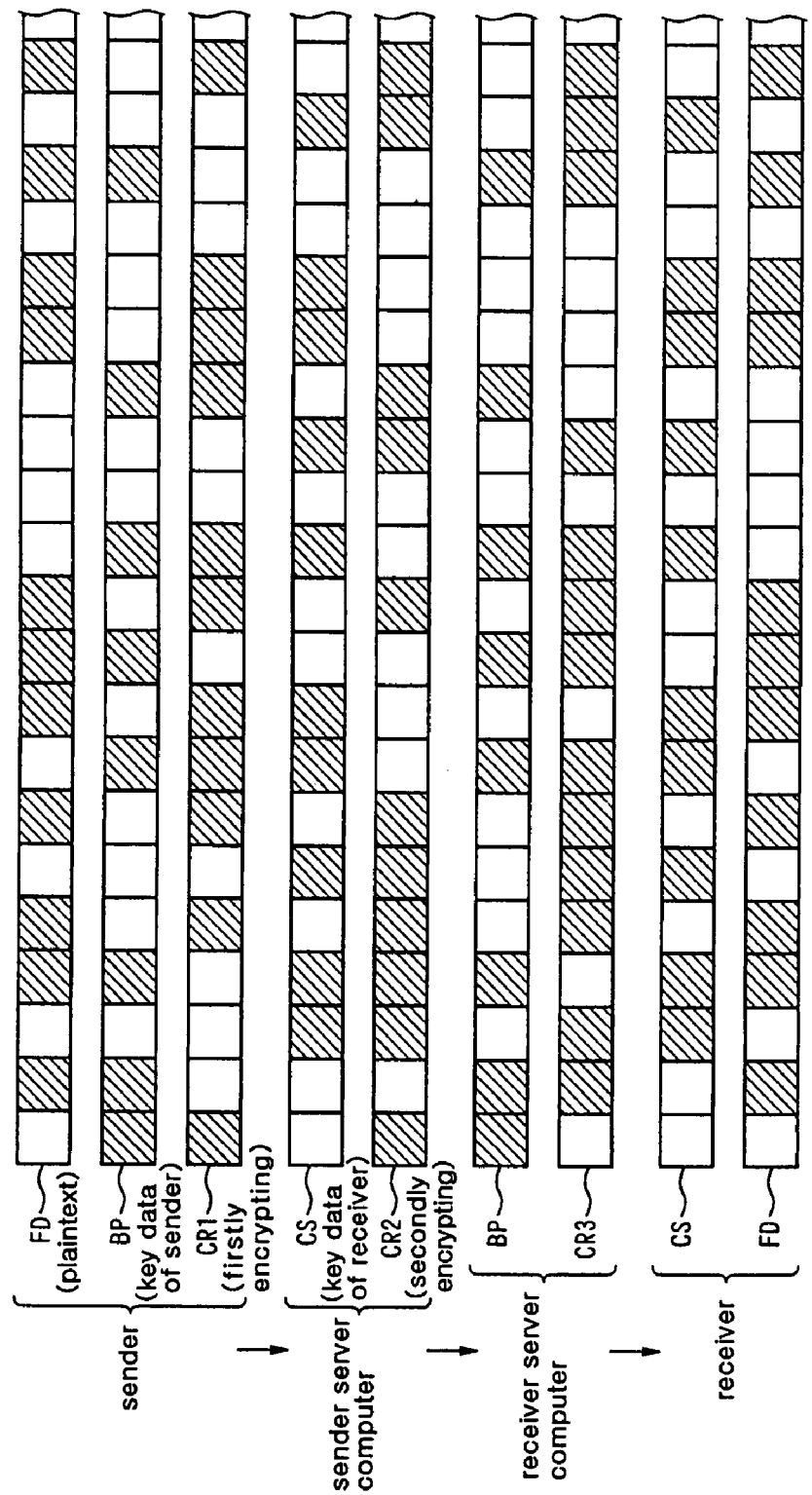
FIG. 3 is an explanatory diagram showing a frame format of a part of each bit data in order to explain a relationship among a plaintext, an electronic key, and an encrypted text in the transmission and reception method according to the present invention.

There will be detailed below an embodiment of the present invention with reference to the accompanying drawings. FIG. 1 is a block diagram showing a frame format of a transmission and reception system and a manner of transmitting and receiving in a second structure according to the present invention; FIG. 2 is an explanatory table showing a relationship between a transmission source and a transmission destination in a transmission and reception method according to the present invention; and FIG. 3 is an explanatory diagram showing a frame format of a part of each bit data in order to explain a relationship among a plaintext, an electronic key, and an encrypted text in the transmission and reception method according to the present invention.

In FIG. 1, "1" represents a web network. To the web network 1, a data center 2 including a main server computer 2A is connected. The main server computer 2A is configured to register electronic key or the like of a sender or a receiver, which is used for a transmission and reception method of the present invention, or authenticate the sender or the receiver. To the web network 1, a plurality of computers of users as senders and receivers are also connected. In FIG. 1, for the sake of convenience for explaining, a sender 3 having a computer 3A and a receiver 4 having a computer 4A are shown. To the web network 1, a server computer 5 (hereinafter, also referred to as a sender server 5) for communications by the sender and a server computer 6 (hereinafter, also referred to as a receiver server 6) for communications by the receiver are connected.

The sender 3 and the receiver 4 register electronic key data used for encrypting and/or decrypting their transmitting or receiving documents, personal data such as their residence, and addresses of the sender server 5 and the receiver server 6 to the server computer 2A of the data center 2. Necessary data is provided based on a request from a person who is authenticated by checking with each data registered in the server computer 2A. The registration of each data to the server computer 2A of the data center 2 is implemented with bit data.

After registering electronic key data and residence respectively to the data center 2, the sender 3 and the receiver 4 send and receive information encrypted as described below via the sender server 5 and the receiver server 6 respectively. The encryption will be described below. In the following example, for the sake of convenience of the sender, the personal data is explained as residence data (address), however, the personal data according to the present invention is not limited to residence data.

The sender 3 firstly encrypts by performing an exclusive OR operation on bit data FD of plaintext to be transmitted in use of bit data BP of own electronic key. The sender 3 adds residence data tag 3*ad* and receiver's residence data tag 4*ad* to the firstly encrypted data CR1 and transmits the firstly encrypted data CR1 to the sender server 5.

The sender server 5 transmits the tag 3*ad* of the sender 3 and the tag 4*ad* of the receiver 4 in the received data to the server computer 2A of the data center 2 for an authentication of validity of the sender 3 and the receiver 4 and obtains electronic key data and address data of the receiver server 6 which are registered by the receiver 4. The sender server 5 secondly encrypts by performing an exclusive OR operation on the firstly encrypted data CR1 received from the sender 3 in use of the bit data CS of the receiver's electronic key obtained from the data center 2. The sender receiver 5 adds the sender's residence data tag 3*ad* and the receiver's residence data tag 4*ad* to the secondly encrypted bit data CR2 and transmits the data CR2 to the receiver server 6.

When receiving the secondly encrypted data CR2, the receiver server 6 transmits the tag 3*ad* of the sender 3 and the tag 4*ad* of the receiver 4 to the server computer 2A of the data center for and authentication of the validity and obtains electronic key data or the sender 3. The receiver server 6 thirdly encrypts by performing an exclusive OR operation on the secondly encrypted data CR2 in use of the bit data BP and forms thirdly encrypted bit data CR3. The receiver server 6 notifies to the receiver 4 that the thirdly encrypted bit data CR3 is received. This notification may be implemented by directly transmitting the thirdly encrypted data CR3 to the receiver 4.

When the receiver 4 performs an exclusive OR operation on the transmitted data of the thirdly encrypted data CR3 in use of bit data CS of own electronic key, the thirdly encrypted data CR3 becomes the original plaintext so that the plaintext information transmitted by the sender 3 can be obtained.

The above described process in which the plaintext transmitted form the sender 3 is encrypted by the server computer 2A, the sender computer 5, and the receiver computer 6, transmitted to the receiver 4, and changed into the original plaintext by the receiver 4 will be explained with reference to a diagram showing a frame format of bit data in FIG. 3. Each bit data in FIG. 3 is shown in data amount sufficient to explain encryption and decryption according to the present invention.

In FIG. 3, FD is an example of a part of plaintext bit data. In the bit data, an uncolored bit represents "0" and a black-colored bit represents "1." When an exclusive OR operation is performed on the plaintext bit data in use of bit data BP of the electronic key of the sender 3, a firstly encrypted bit data CR1 shown blow the data BP is obtained.

When a further exclusive OR operation is performed on the firstly encrypted data CR1 in use of bit data CS of the electronic key of the receiver 4, a secondly encrypted bit data CR2 shown below the data CS is obtained.

Next, an exclusive OR operation is performed on the secondly encrypted data CR2 in use of bit data BP of the electronic key of the sender 3, a thirdly encrypted bit data CR3 in which the sender's key data BP is decrypted is obtained.

Here, an exclusive OR operation is performed on the thirdly encrypted data CR3 in use of bit data CS of the electronic key of the receiver 4, the receiver's electronic key data CS is removed and the thirdly encrypted bit data CR3 is decrypted into a plaintext bit data FD.

In the above explanation, a server computer is composed of the server computer 2A of the data center 2, the sender server computer 5, and the receiver server computer 6, and each role is shared by the server computer 2A of the data center 2 and the server computers 5 and 6. However, in the information encrypting transmission and reception method according to the present invention, the roles of the sender server computer 5 and the receiver sever computer 6 may be performed by the server computer 2A of the data center 2.

As described above, according to the information encrypting transmission and reception method of the present invention, encryption of transmitted information and authentication are performed simultaneously and inseparably by implementing the following processes serially via the server computer 2A as an authenticator in the dater center 2. The processes are:

the sender 3 transmits information which is firstly encrypted with the sender's electronic key data to the sender server computer 5 via the web network 1;

the sender server computer 5 is authenticated by the data center 2, secondly encrypts the firstly encrypted information, and transmits the secondly encrypted information to the receiver server 6 via the web network 1;

the receiver server 6 is authenticated by the data center 2, thirdly encrypts the secondly encrypted information with the sender 3's electronic key data, and informs the receiver 4 about the reception of the thirdly encrypted information or transmits the thirdly encrypted information to the receiver 4; and the receiver 4 receives the thirdly encrypted information and decrypts the information into plaintext with the receiver's electronic key.

As a result, according to the transmission and reception method of the present invention, exchanging digital signatures between the sender and the receiver to authenticate the validity of the sender is not required as shown in the conventional RSA system and such trouble can be avoided.

However, in the method of the present invention, when a chaos image or a fractal image (still image or moving image) is used as data of electronic key, the receiver cannot determine whether the received information is correct information, information with viruses, falsified information, spoofed information, or just a noise. Accordingly, in the present invention, the receiver 4 is informed by so called an electronic envelop function formed of a still image or moving image with sound that the receiver server computer 6 receives mail from the sender 3.

When the sender 3 and the receiver 4 register their encryption keys data to the server computer 2A of the data center 2, bit data used for the electronic envelop function is registered as one of the above described personal data (including address or the like). The registered bit data is attached to data of communication document and transmitted to the receiver server computer 6. Then the receiver server 6 transmits the bit data to the receiver 4 as an electronic envelop. The data used for the electronic envelop function may be registered to the data center 2 as a common key of particular sender 3 and receiver 4.

INDUSTRIAL APPLICABILITY

As described above, according to the encrypted transmission and reception method of the present invention, processing speed is fast since the number of bits in the original information such as plaintext and the number of bits in the encrypted information do not change no matter how many times the information is encrypted. Further, since the encryption processes are performed in use of a plurality of electronic keys, there is an advantage that security is more robust in the present invention.

According to the method of the present invention, when a chaos image data or a fractal image data of moving image is used as key data, the key data can be changed as many times as needed not every communication but every small period of time such as $\frac{1}{100}$ second. Thus, it is virtually impossible for a third person to do something dishonest.

Further, since the receiver is informed in advance, by the electronic envelop function, that a communication document encrypted in use of the above moving image data as key data is to be transmitted to the receiver, any problem such that the receiver confuses the data with other data or does not recognize the reception of the communication document will not occur even when the communication document transmitted to the receiver is highly encrypted data by the decryption method of the present invention.

The invention claim is:

1. An information encrypting transmission and reception system in an information transmission and reception network composed of a plurality of senders and receivers having computers being connected and communicating each other via a web network and a data center having a server computer for receiving electronic key data of bit data formed by the senders and receivers and personal data such as address corresponding to each electronic key data to register the server computer and providing the data only to a person who is certified his or her validity in use of the registered data as certification data, comprising:

providing a sender server computer for transmitting and receiving data of the senders and a receiver server computer for transmitting and receiving data of the receivers that are connected to the web network;

firstly encrypting bit data of original information such as plaintext to be transmitted from one of the senders to one of the receivers by performing an exclusive OR operation in use of bit data of electronic key of the sender and transmitting the firstly encrypted bit data attached with personal data of the receiver to the sender server computer;

by the sender server computer, receiving bit data of the electronic key of the receiver by submitting personal data of the receiver to the data center, secondly encrypting the firstly encrypted bit data by performing exclusive OR operation in use of received bit data of the electronic key of the receiver, and transmitting the secondly encrypted bit data attached with personal data of the sender and the receiver to the receiver server computer;

by the receiver server computer, receiving the secondly encrypted bit data, receiving bit data of the electronic key of the sender by submitting personal data of the sender to the data center, thirdly encrypting the secondly encrypted bit data by performing exclusive OR operation in use of received bit data of the electronic key of the sender, and informing the receiver about the reception of the thirdly encrypted bit data or transmitting the thirdly encrypted bit data to the receiver; and by the receiver, obtaining the original information such as plaintext from the sender by performing an exclusive OR operation on the thirdly encrypted bit data in use of the bit data of the electronic key of the receiver.

2. The information encrypting transmission and reception system according to claim 1, wherein the original information such as plaintext is preliminary encrypted by performing an exclusive OR operation on at least each bit of the original information in use of random number bit data in advance of firstly encrypting of the original data in use of bit data of the electronic key of the sender.

3. The information encrypting transmission and reception system according to claim 2, wherein bit data of the random number and/or electronic key is a password random number of the n bit including 6 to 10 digits of 64 bits, a pseudo random number based on the random number, a chaos random number, or a fractal random number.

4. The information encrypting transmission and reception system according to claim 2, wherein the server computer of the data center uses electronic key data set by each sender and receiver as electronic personal seal data for authentication and as information hiding data for hiding data transmitted and received between the sender and the receiver.

5. The information encryption transmission and reception system according to claim 4, wherein chaos image data or fractal image data is used for the electronic personal seal data and/or the information hiding data.

6. The information encrypting transmission and reception system according to claim 5, wherein the image data in claim 5 is moving image data.

7. The information encrypting transmission and reception system according to claim 1, wherein the receiver server computer informs the receiver with an electronic envelop data that encrypted communication document is received.

8. The information encrypting transmission and reception system according to claim 7, wherein bit data of the random number, bit data of the electronic key, and bit data of the electronic envelop are registered to the data center or the server computer set as an authenticator so as to be readable only by an authenticated person.

* * * * *